United States Patent [19]
Golston et al.

[11] Patent Number: 5,327,240
[45] Date of Patent: Jul. 5, 1994

[54] METHODS, SYSTEMS AND APPARATUS FOR PROVIDING IMPROVED DEFINITION VIDEO

[75] Inventors: Jeremiah Golston, SugarLand; Christopher J. Read, Houston; Walt Bonneau, Jr., Missouri City, all of Tex.

[73] Assignee: Texas Instruments Incorporated, Dallas, Tex.

[21] Appl. No.: 814,970

[22] Filed: Dec. 24, 1991

[51] Int. Cl.$^5$ .................. H04N 5/14; H04N 5/213; H04N 7/01
[52] U.S. Cl. .................................. 348/607; 348/441
[58] Field of Search ................ 358/11, 166, 167, 36, 358/37, 140; 382/41, 28, 54; 364/715.01, 724.01, 715.06; H04N 5/14, 5/208, 9/64, 5/213, 7/07

[56] References Cited

U.S. PATENT DOCUMENTS

| | | | |
|---|---|---|---|
| 4,682,230 | 7/1987 | Perlman et al. | 358/36 |
| 4,684,989 | 8/1987 | Roeder et al. | 358/36 |
| 4,937,667 | 6/1990 | Choquet | 358/140 |
| 5,134,480 | 7/1992 | Wang et al. | 358/11 |

OTHER PUBLICATIONS

Christopher, et al. "A VLSI Median Filter for Impulse Noise Elimination in Composite or Component TV Signals" *IEEE Transactions on Consumer Electronics*, vol. 34, No. 1, Feb., 1988, pp. 262-266.

Salo, et al., "Improving TV Picture Quality with Linear-median type Operations" *IEEE Transactions on Consumer Electronics*, vol. 34, No. 3, Aug., 1988, pp. 373-378.

*Primary Examiner*—James J. Groody
*Assistant Examiner*—Glenton B. Burgess
*Attorney, Agent, or Firm*—James F. Hollander; James C. Kesterson; Richard L. Donaldson

[57] ABSTRACT

A method is provided for deinterlacing pixels in a video display system operable to display images as a plurality of pixels arranged in first and second fields of interlaced rows, at least one video component level quantified by a numerical video component value characterizing each pixel in an image with the video component levels for the pixels in the first and second fields being updated on alternate scans. A global mean video component value is computed from the video component values generated for a previous scan of at least one of the first and second fields. A global standard deviation is computed for the global mean. A local mean video component value is computed from the video component values generated for a plurality of pixels being updated as part of the current scan of the first field and defining a neighborhood of a pixel in the second field being deinterlaced. A local standard deviation is computed form the local mean video component value. The local standard deviation is compared with a selective multiple of the global standard deviation and if the local standard deviation is less than the selected multiple of the global standard deviation, the video component value generated for the pixel being deinterlaced as part of the previous scan of the second field is carried forward and if the local standard deviation exceeds the selected multiple of the global standard deviation then the video component value for the pixel being deinterlaced is set to the computed local mean video component value.

37 Claims, 2 Drawing Sheets

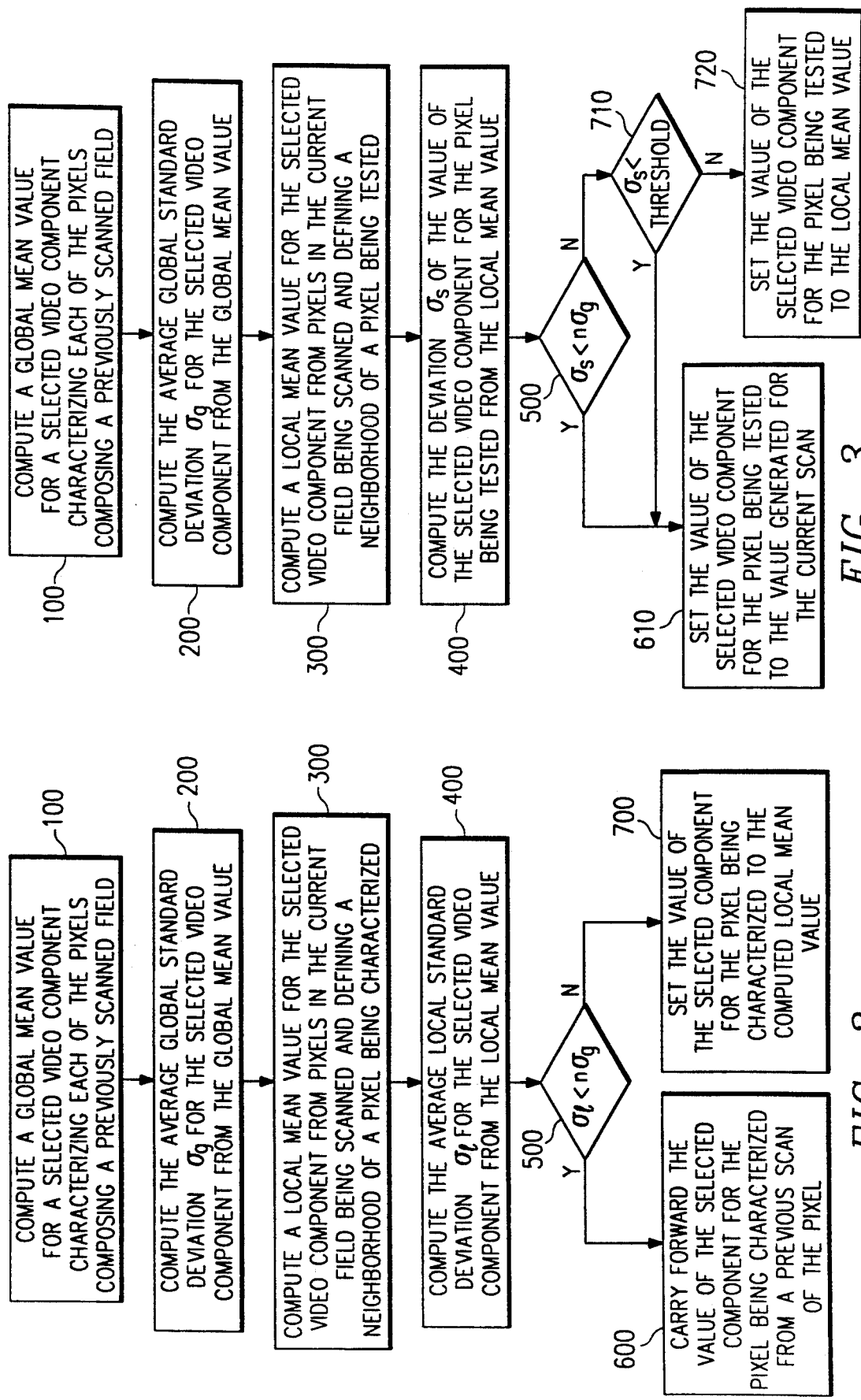

METHODS, SYSTEMS AND APPARATUS FOR PROVIDING IMPROVED DEFINITION VIDEO

NOTICE (C) Copyright, *M* Texas Instruments Incorporated, 1990. A portion of the Disclosure of this patent document contains material which is subject to copyright protection. The copyright and mask work owner has no objection to facsimile reproduction by anyone of the patent document or the patent disclosure, as it appears in the U.S. Patent and Trademark Office, patent file or records, but otherwise reserves all rights in its copyright and mask work whatsoever.

CROSS-REFERENCE TO RELATED APPLICATIONS

U.S. patent application Ser. No. 07/435591, filed Nov. 17, 1989, entitled "MULTI-PROCESSOR WITH CROSSBAR LINK OF PROCESSOR AND MEMORIES AND METHODS OF OPERATION";

U.S. patent application Ser. No. 07/437,858, filed Nov. 17, 1989, entitled "SIMD/MIMD RECONFIGURABLE MULTI-PROCESSOR AND METHOD OF OPERATION";

U.S. patent application Ser. No. 07/437,856, filed Nov. 17, 1989, entitled "RECONFIGURABLE COMMUNICATIONS FOR MULTI-PROCESSOR AND METHOD OF OPERATION";

U.S. patent application Ser. No. 07/437,856, filed Nov. 17, 1989, entitled "REDUCED AREA OF CROSSBAR AND METHOD OF OPERATION";

U.S. patent application Ser. No. 07/437,853, filed Nov. 17, 1989, entitled "SYNCHRONIZED MIMD MULTI-PROCESSORS, SYSTEM AND METHOD OF OPERATION";

U.S. patent application Ser. No. 07/439,946, filed Nov. 17, 1989, entitled "SLICED ADDRESSING MULTI-PROCESSOR AND METHOD OF OPERATION";

U.S. patent application Ser. No. 07/437,857, filed Nov. 17, 1989, entitled "ONES COUNTING CIRCUIT AND METHOD OF OPERATION";

U.S. patent application Ser. No. 07/437,851, filed Nov. 17, 1989, entitled "MEMORY CIRCUIT RECONFIGURABLE AS DATA MEMORY OR INSTRUCTION CACHE AND METHOD OF OPERATION";

U.S. patent application Ser. No. 07/437,854, filed Nov. 17, 1989, entitled "IMAGING COMPUTER AND METHOD OF OPERATION";

U.S. patent application Ser. No. 07/437,875, filed Nov. 17, 1989, entitled "SWITCH MATRIX HAVING INTEGRATED CROSSPOINT LOGIC AND METHOD OF OPERATION";

all of the above are assigned to Texas Instruments Incorporated, the assignee of the present application, and are cross-referenced and incorporated into the present application by reference herein.

TECHNICAL FIELD OF THE INVENTION

The present invention relates to video display systems and methods.

BACKGROUND OF THE INVENTION

Manufacturers of video display systems, such as televisions and VCRs are constantly searching for ways to improve the clarity of the displayed images. Presently, at least two problems stand in the way of designers of high definition video display systems. The first of these problems is corruption of pixels by impulse noise, impulse noise in general being caused by outside influences on the video display system. The second problem is the loss of image definition inherent with the use of interlaced video displays, presently the standard television display configuration in the United States.

In broadcast television applications, impulse noise is primarily the result of either the receipt of transmitted signals having a poor signal to noise ratio or spurious electromagnetic pulses, often generated by neighboring home appliances. When the television or video system is being used to play back images stored on a video cassette or disk, impulse noise is commonly the result of the media storing the images being worn or defective. In each case, the impulse noise degrades the displayed image by injecting the familiar small white dots or streaks in the image.

These problems are further complicated because video images are for the most part dynamic, depicting constantly moving or changing scenes. The display screen must therefore be constantly updated which in turn requires any filtering approach to operate dynamically and with sufficient speed to handle changes in the displayed images.

Under the current interlaced television format, each frame displayed consists of two "interlaced" fields formed by alternating rows of pixels, normally designated as the odd and even fields. The fields are alternately scanned at a rate of 60 Hz such that an entire image or frame is updated effectively at a frame rate of 30 Hz. With each scan the video components of intensity and chroma of each pixel in the field being scanned are updated to display the characteristics of the desired image. Through this updating, motion and other changes in the images are accounted for. The interlaced field format has a substantial disadvantage however. Discontinuities arise when one field is updated to display a new image while the other field remains set to the previous image. In essence, one field is always lagging behind the other due to the alternating scan.

One means of eliminating the problem of interlaced rows in a video display screen is the double line approach in which pairs of adjacent odd and even rows are simultaneously updated to display the same line of the image. While providing video component data for those pixels in the field not being scanned, this approach substantially lowers the resolution of the displayed image since each row in the scanned field is simply being doubled. Further, this approach alone does not simultaneously account for the problems relating to impulse noise.

A second approach, which may applied both to the problem of reduced definition from interlaced displays and the problem of pixels corrupted by impulse noise is median filtering. In median filtering, a median value is taken for the intensity and/or chroma levels (the video component values) for a given group of pixels in a selected neighborhood of a pixel being characterized. The video component value or values for the pixel being characterized are then set at the median value. The processing then moves on to another pixel where the same steps are repeated. This is performed for each pixel in the display screen. In this manner video component levels are made available for those pixels not in the field being updated as part of the current scan. Further, corrupted pixels in the field being currently scanned, which normally would exceed the median video values for the neighborhood, are eliminated by simple replacement with median. This approach has the serious disadvantage of blurring the displayed images since groups of pixels are always being set to the median. Most importantly, median filtering is computationally intensive thereby demanding maximum performance out of the video system. This is especially significant since preferably the filtering would be performed in real time.

The median filtering approach can be improved by dynamic "thresholding" such that only those pixel component levels exceeding the median value by more than a specified amount are actually replaced with the median. For a pixel in the field not being updated on the current scan, a comparison of the value of the selected video component level for that pixel, taken from the previous scan, can be made against the median value for that component as calculated for the neighborhood, and if the value for the previous level exceeds the neighborhood median, the pixel is set to the median level, otherwise the previous value for the previous level for that pixel is carried forward. For a pixel in the current scan, the value of current selected video component level is compared with the neighborhood median value and if that value exceeds the neighborhood median, such as in the case of a pixel corrupted by impulse noise, the pixel component level can be replaced with the component level associated with the median value, otherwise the level generated for the current scan is used.

Thus the need had arisen for improved devices, systems and methods for providing high definition video images. Such means should address video display definition problems arising both from pixels corrupted by impulse noise and from interlacing of pixels in the standard display format. Further, such means not be so computationally intensive as to make real time operation difficult.

SUMMARY OF THE INVENTION

According to the invention, a method is provided for deinterlacing pixels in a video display system operable to display images as a plurality of pixels arranged in first and second fields of interlaced rows, at least one video component level quantified by a numerical video component value characterizing each pixel in an image with the video component levels for the pixels in the first and second fields being updated on alternate scans. A global mean video component value is computed from the video component values generated for a previous scan of at least one of the first and second fields. A global standard deviation from the global mean is computed. A local mean video component value is computed from the video component values generated for a plurality of pixels being updated as part of the current scan of the first field and defining a neighborhood of a pixel in the second field being deinterlaced. A local standard deviation from the local mean video component value is computed. The local standard deviation is compared with a selected multiple of the global standard deviation and if the local standard deviation is less than the selected multiple of the global standard deviation the video component value generated as part of a previous scan of the second field for the pixel being deinterlaced is carried forward and when the local standard deviation exceeds the selected multiple of the global standard deviation the video component value for the pixel being deinterlaced is set to the computed local mean video component value.

According to other aspects of the invention, a method of detecting and replacing corrupted pixels in the video display is provided. According to this embodiment, a local mean video component value is computed from the video component values generated for a plurality of pixels being updated as part of the current scan of the first field and neighboring a pixel in the first field being tested for corruption. The deviation from the local mean value of the video component value generated to update the pixel being tested as part of the current scan of the first field is computed. The video component level of the pixel being tested is characterized as quantified by the video component value, generated to update the pixel being tested as part of the current scan, if the deviation from the local mean is less than a selected multiple of the global standard deviation. If the deviation from the local mean exceeds the selected multiple of the global standard deviation, a comparison is made between the deviation from the local mean and a preselected threshold value. If the deviation from the local mean is less than the preselected threshold value, then the video component value generated to update the pixel being tested as part of the current scan of the first field is used to quantify the video component level of that pixel. If the deviation from the local mean exceeds the preselected threshold then the video component value generated to update the pixel being tested is replaced with a new video component value.

The present invention has significant advantages over currently available median filtered techniques. The computational intensity is significantly reduced allowing for the generation of high definition video images in real time. Reduction in the required computation capabilities allows for the implementation of high definition displays in a wider variety of products. Further, the embodiments of the present invention are available to address video display definition problems arising both from pixels corrupted by impulse noise and from the interlacing of pixels in the standard display format.

BRIEF DESCRIPTION OF THE DRAWINGS

For a more complete understanding of the present invention, and the advantages thereof, reference is now made to the following descriptions taken in conjunction with the accompanying drawings in which:

FIG. 2 is a flow chart describing a preferred method of deinterlacing pixels in a video display system according to the present invention; and FIG. 3 is a flow chart describing a preferred method of detecting and replacing corrupted pixel in a video display system according to the present invention.

DETAILED DESCRIPTION OF THE INVENTION

Figure 1:
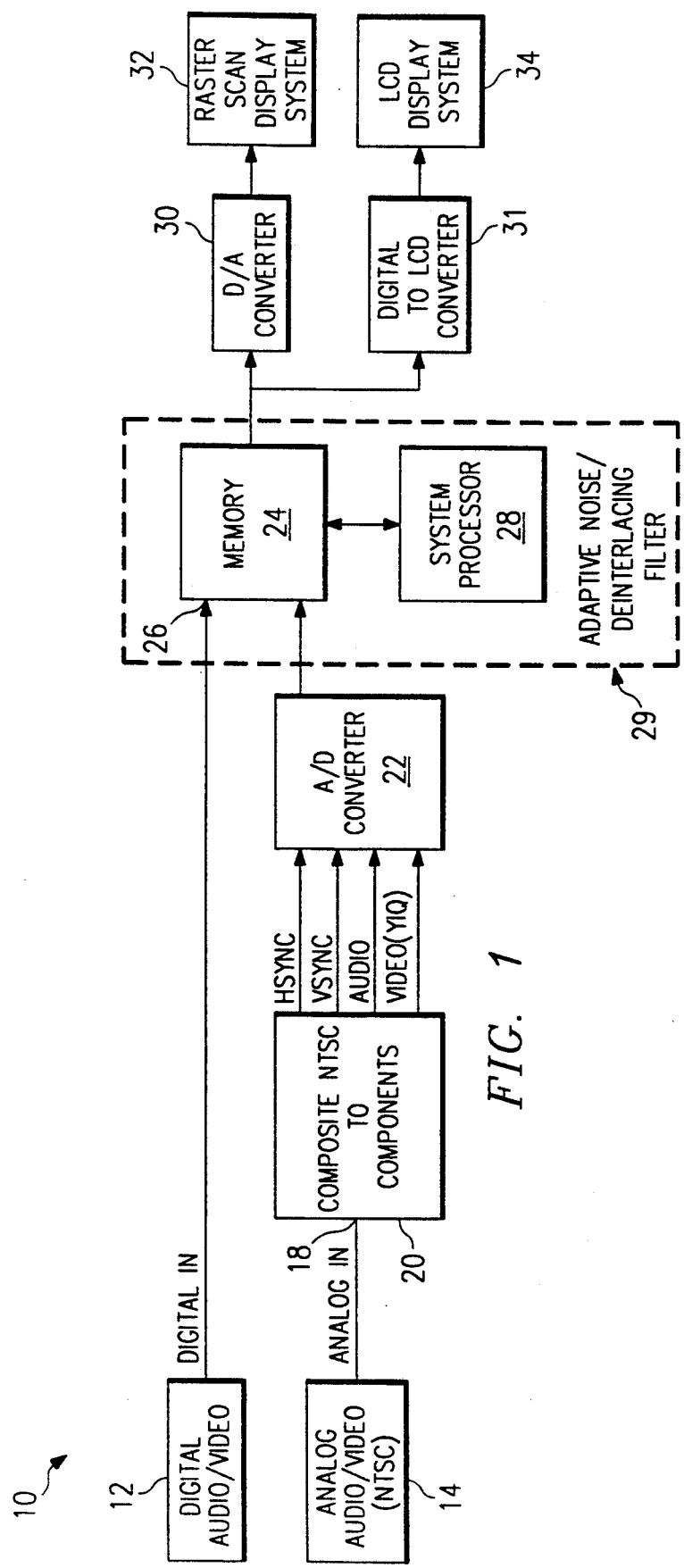
FIG. 1 is a functional block diagram illustrating a video display system embodying the principles of the present invention.

The preferred embodiment of the present invention and its advantages are best understood by referring to FIG. 1 which is a block diagram of a video processing and display system 10 constructed in accordance with the principles of the illustrated embodiment of the present invention. The invention is described in connection with video processing and display systems as an example only, without limiting the general scope of the invention.

Video processing and display system 10, as illustrated in FIG. 1, includes a digital audio/video source 12 and an analog audio/video source 14. Digital audio/video source 12 may be, for example, a television receiver, a high definition television (HDTV), DC1, DC2, a laser disk system, a digital tape system, or any other source digitized of audio/video data. Analog audio/video source 14 may be, for example, a television receiver or VCR outputting signals in analog form such as those defined by the NTSC (National Television Systems Committee), PAL (Phase Alternation Line), and SECAM (Sequential Coleur Â Memoire) standard formats. While the illustrated system shown in FIG. 1 includes provisions for both digital and analog input sources, it is important to note that only one of the two sources is required in the actual operation of video processing and display system 10. In other words, the illustrated embodiment of system 10 includes optional inputs for receiving data from either an analog input source 14 or a digital input source 12.

Analog audio/video data is received through the analog input port 18. Composite NTSC to components circuitry 20 separates the NTSC analog signals received at input 18 into their component parts which include the horizontal synchronization signal (HSYNC), the vertical synchronization signal (VSYNC), the audio data component and the video data components (YIQ). The video components (YIQ) include the intensity component level (the luminance or Y component) and two color components levels (the chroma or I and Q components). The individual component levels split out of the composite NTSC signals are then converted from analog component levels to digital values by analog to digital converter circuitry 22, with the digitized data sent to the system memory 24 for buffering. When a digital audio/video source 12 is being used, no analog to digital conversion is necessary and the digital audio/video data values representing the levels of the video components are coupled in through digital input port 26 directly to the system memory 24.

The processing of the digitized audio, video, and synchronization signals is performed under the control of system processor 28 through system memory 24. Together, system processor 28 and system memory 24 comprise the adaptive noise/deinterlacing filter 29 of system 10. It should be recognized that circuitry 29 may be a discrete unit, provided as part of the input circuitry 12/14 (for example as part of a VCR) or provided as part of the associated display system discussed further below. As discussed below in further detail, system processor 28 performs filtering and deinterlacing on the intensity and/or chroma components in accordance with the present invention. System processor 28 may in one embodiment be constructed in accordance with the principles set forth in copending and coassigned patent applications Ser. No. 07/435,591, filed Nov. 17, 1989, Ser. No. 07/437,858, filed Nov. 17, 1989, Ser. No. 07/437,856, filed Nov. 17, 1989, Ser. No. 07/437,852, filed Nov. 17, 1989, Ser. No. 07/437,853, filed Nov. 17, 1989, Ser. No. 07/437,946, filed Nov. 17, 1989, Ser. No. 07/437,857, filed Nov. 17, 1989, Ser. No. 07/437,851, filed Nov. 17, 1989, Ser. No. 07/437,854, filed Nov. 17, 1989, and Ser. No. 07/437,875, filed Nov. 17, 1989 incorporated herein by reference. The horizontal and vertical synchronization signals are employed by system processor 28 to generate the proper timing relationships during processing, as well as providing timing of the video display. Concurrent with the video processing, audio data input to processor 28 may also be filtered.

Following digital processing of the video and/or audio signals, the digitized data is either converted by digital to analog converter 30 back into analog form or converted into a form suitable to drive a liquid crystal display by digital to LCD converter 31. The analog data from D/A converter 30 drives display system 32. Display system 32, as known in the art, may be a standard format raster scan display system as would be used for example in currently available television sets or color monitors. Digital to LCD converter 31 drives a liquid crystal display system 34. Display systems 32 and 34 display images as a plurality of pixels arranged, as known in the art, in fields of rows. For the deinterlacing methods invention discussed below, display systems 32 and 34 will be non-interlaced display systems. For the corrupted pixel detection and replacement methods and systems according to further embodiments of the present invention, display systems 32 may be either interlaced or non-interlaced displays, and 34 will be non-interlaced. In the standard video data transmittal format, as shown in the art, the intensity and chroma components of each of the pixels are updated by alternate scanning (broadcasting) as odd and even fields of rows. While the illustrated system 10 includes provisions for both a raster scan display system 32 and a liquid crystal display system 34, only one of the two display systems 32/34 is actually required for the operation of video system 10. In other words, the illustrated embodiment of system 10 includes optional raster scan and liquid crystal displays 32 and 34.

FIG. 2 depicts the process flow for deinterlacing pixels to be displayed on display systems 32 and 34. For purposes of the description the present invention, the term "deinterlacing" is used to designate the process by which a selected video component (i.e., the intensity component and/or one of the chroma components) is determined for the pixels composing the one field not being updated as part of the current scan. When analog video is being input and processed by filter circuitry 29, the process flow shown in FIG. 2 is executed by system processor 28 from system memory 24 following conversion of the analog intensity and chroma component levels into digital video component values. When digital video is being input into filter circuitry 29, system processor 28 executes the process flow of FIG. 2 on the digital video component values received directly from digital video source 12. For illustration purposes only, the video component levels being processed will be quantified in terms of 8-bit digital words (video component values), however, it should be recognized that the video components may be as easily described in terms of digital words of varying bit widths depending on the data configuration selected for the operation of system 10, as well as the desired display resolution. Differences in the width of the digital data words do not change the data processing flow of the present invention. Additionally, for illustration purposes, the processing methods according to the present invention will be described in terms of only a selected one of the three video components (the one intensity and two chroma components) characterizing each pixel in the display. It is also important to note, however, the deinterlacing can be performed as required on any or all of the video components characterizing a given pixel.

At step 100, a global mean value is computed for the levels of the selected video component (as quantified by digital video component values) taken for each of the pixels composing at least one previously scanned field. The global mean value may be taken from the video data generated for the immediately preceding scan of opposite field (i.e. if the current scan is updating the even field, the data would be taken from the odd or "opposite" field) or the previous scan of the same field currently being updated. Alternatively, the global mean may be computed from both the previous scan of the opposite field and the previous scan of the same field as that being updated during the current scan.

The global mean value may be computed using one of at least two computational techniques. In the first computational technique, processor 28 takes a running sum of the digital video component values, quantifying the video component levels being processed, as the data is generated for each pixel in the previous field or fields. When all values for each of the pixels in the field or fields used to compute the mean have been summed, processor 28 divides the total sum by the number of pixels in the previous field or fields to obtain the global mean. This technique can be represented by the formula:

$$M_g = \frac{\sum_{j=0}^{m-1} P_j}{m} \quad (1)$$

where:

$P_j$ is the value representing the level of the video component being processed for a pixel j from the previous field or fields;

m is the total number of pixels from the previous field or fields used to calculate the global mean; and $M_g$ is the global mean value.

Alternatively, the global mean may be computed through the generation of a histogram. In the illustrated embodiment where each video component level may be quantified by an 8-bit digital word (video component value), the histogram will include 256 bins with each bin representing one of the possible 256 digital video component values quantifying the level selected video component of a given pixel. For each bin, processor 28 multiplies the video component value represented by the bin by the number of pixels in the bin (i.e., the number of pixels having the selected video component level quantified by that digital value). The sum of the product of the bin count and the value represented by the bin, computed for each bin, is as taken for all bins in the histogram. The global mean is then obtained by dividing the sum for all the bins by the total number of pixels in the field or fields selected as a basis for the computations. This alternative can be expressed by the equation $$M_g = \frac{\sum_{i=0}^{n-1} P_i \times hist(i)}{m} \quad (2)$$

where:

$P_i$ is the video component value represented by bin i;

hist(i) is the number of pixels in bin i;

n is the total number of bins (i.e. 256 in the case of component values represented by 8 bits); and m is the total number of pixels used to calculate the global mean as taken from the previous field or fields; and $M_g$ the global mean.

At step 200, the global standard deviation ($\sigma_g$) is computed for the video component being processed from the global mean value calculated at step 100. This step may also be illustrated in terms of at least two computational techniques. In the first alternative, for each pixel in the field or fields used to calculate the global mean, the absolute difference between the global mean and the video component value quantifying the level of the selected video component is computed. The sum of the absolute differences between the global mean and the video component values is then computed for all the pixels composing the field or fields selected to base the global mean value computation. The standard deviation is then computed by dividing the sum taken for all the pixels by the total number of pixels used in the calculation. This alternative is described by the equation $$\sigma_g = \frac{\sum_{j=0}^{m-1} |M_g - P_j|}{m} \quad (3)$$

In the second option, the histogram previously generated to calculate the global mean is again used to compute the global standard deviation. For a given bin, the absolute difference between the video component value represented by the bin and the global mean previously calculated is computed. The calculated difference is then multiplied by the number of pixels in the bin. The computations are repeated for each bin in the histogram and the results summed. The global standard deviation is obtained by dividing the sum of the results taken for all the bins in the histogram by the total number of pixels used in the global mean value calculation. This alternate is described by the equation:

$$\sigma_g = \frac{\sum_{i=0}^{n-1} |M_g - P_i| \times hist(i)}{m} \quad (4)$$

At step 300, a local mean value is computed for the levels of video component being processed from a group of pixels in the current field being scanned and in the neighborhood of the pixel being deinterlaced (located in the field not presently being scanned). The pixels forming the neighborhood may be either adjacent to the pixel being deinterlaced or within the immediate vicinity thereof. In order to ensure good definition of image boundaries as well as motion, the neighborhood upon which the local is based must be sufficiently small and sufficiently close to the pixel being characterized. In the present example, the local mean value can be computed using either of the two techniques illustrated for computing the global mean at step 100. In this case, however, the video component values used are only those generated for the current scan of the local neighborhood. The two methods are described in equations (5) and (6):

$$M_l = \frac{\sum_{k=0}^{l-1} P_k}{l} \quad (5)$$

where:

$P_k$ is the value representing the level of the selected component as generated for the current scan pixel k from the local neighborhood;

l is the number of pixels in the local neighborhood; and $M_l$ is the local mean value.

$$M_l = \frac{\sum_{q=0}^{r-1} P_q \times hist(q)}{l} \quad (6)$$

where:

$P_q$ is the video component value represented by bin q;

r is the total number of bins;

hist(q) is the total number of pixels from the local neighborhood in bin q;

l is the number of pixels in the local neighborhood; and $M_l$ is the local mean value.

At step 400, the local standard deviation is computed for the selected video component using the local mean value. In the illustrated example, the local standard deviation can be computed using either of the two techniques used to compute the global standard deviation at step 200, only in this step the local mean value calculated at step 300 and the video component values generated for the preselected neighborhood in the current scan are used. The two illustrated options follow equations (7) and (8):

$$\sigma_l = \frac{\sum_{k=0}^{l-1} |M_l - P_k|}{l} \quad (7)$$

$$\sigma_l = \frac{\sum_{q=0}^{r-1} |M_l - P_q| \times hist(q)}{l} \quad (8)$$

The next step in the deinterlacing process is to compare the local standard deviation calculated at step 400 with the global standard deviation calculated at 200. This comparison is performed at step 500 in the process flow depicted in FIG. 2. If the local standard deviation is less than a preselected multiple of the global standard deviation, then at step 600, the value representing the level of the video component being processed is carried forward for the pixel being deinterlaced from the previous scan (updating) of that pixel. If on the other hand, the local standard deviation exceeds the preselected multiple of the global standard deviation, then at step 700 the value representing the level of the video component being processed for the pixel being deinterlaced is set to the local mean value computed at step 300.

In this fashion, a value representing the level for at least one video component is determined for a pixel not being updated as part of the currently received data. The digital video component value can then be converted to video component levels by analog to digital converter 30 or digital to LCD converter 31 to drive the associated display 32/34. The other video components for that pixel may also be determined using the same method for complete deinterlacing. The process flow shown in FIG. 2 may also be repeated for each pixel composing the field not being currently updated to provide an overall high definition image.

Referring next to FIG. 3, a process flow is depicted for the method of detecting and replacing corrupted pixels according to the present invention. The process flow of FIG. 3 may be used in either interlaced or non-interlaced display systems, and the case of interlaced displays in conjunction with or independent of, the deinterlacing embodiment previously discussed in detail above. In this case, it is the video component values representing the component levels of pixels being updated in the current scan which are being checked for corruption and replaced as necessary Steps 100 through 300 are essentially the same as described above in connection with the pixel deinterlacing method.

At step 400 the deviation from the local mean component value is computed for the digital component value representing the level of the selected video component of the pixel being updated as part of the current scan. This step can be expressed by the equation:

$$\sigma_s = |P_s - M_l| \quad (9)$$

where:

$\sigma_s$ is the deviation from the local mean of pixel s;

$P_s$ is the video component value generated for pixel s in the current scan; and $M_l$ is the local mean.

In the method depicted in FIG. 3, if at step 500 the deviation from the local mean for the pixel being checked is less than a selected multiple of the global standard deviation, then the value representing the level of the selected video component of the pixel being checked is set at step 610 to the value representing the level already determined for the current scan of that pixel. In other words, in this instance at least the tested video component value for the pixel being processed is assumed not to be corrupted. If on the other hand, the deviation from the local mean exceeds the selected multiple of the global standard deviation, then a further comparison is required at step 710. At step 710, the deviation from the local mean is compared with a threshold value. The threshold value is selected to eliminate the possibility that a corrupted pixel may be detected when the global standard deviation is so small that the deviation from the local mean may exceed the preselected multiple of the global deviation notwithstanding the fact that the pixel being checked is not corrupted. If at step 710, the deviation from the local mean is less than the selected threshold, then the processing returns to step 600 and the value representing the level of the selected component as previously generated for the current scan of the tested pixel is used. If on the other hand, the deviation from the mean exceeds the selected threshold, then the value of the video component being processed for the pixel being tested is instead replaced with the local mean value at step 720. The local mean value now represents the video component level of the tested pixel. Alternatively, since the corrupted pixel has been detected using the less processing intensive mean value approach of the present illustrated embodiment, the corrupted pixel may be replaced with the local median value. The local median value may be derived from any of the known median filtering/computational techniques. The digital video component value determined after the testing for corruption and replacement if required is then converted by either analog to digital converter 30 or digital to LCD converter 31 to drive the associated display 32/34.

In the illustrated embodiment, the process flow shown in FIG. 3 may be repeated for each pixel being updated as part of the currently received data scan to remove impulse noise created corrupted pixels from the entire field. Also, as with deinterlacing, the corrupted pixel detection/replacement method depicted in FIG. 3 may be used on any one of the three video components characterizing a given pixel, all three components, or any combination thereof. In other words, detection and replacement according to the described embodiment can be performed on any one or any combination of the video components characterizing a given pixel.

Although the present invention and its advantages have been described in detail, it should be understood that various changes, substitutions and alterations can be made herein without departing from the spirit and scope of the invention as defined by the appended claims.

What is claimed is:

1. A method for displaying images in a video display system comprising the steps of:
   generating video component level signals for pixels of images to be displayed as first and second fields of interlaced rows updated on alternate scans, the component level signals quantified by video component values represented as digital signals;
   deinterlacing the pixels in the first and second fields to produce pixels for deinterlaced images using the video component values as represented by the digital signals, said step of deinterlacing comprising the steps of:
      computing a global mean video component value from the video component values generated for a previous scan of at least one of the first and second fields;
      computing a global standard deviation from the global mean;
      computing a local mean video component value from the video component values generated for the plurality of pixels being updated as part of the current scan of the first field and defining a neighborhood of a pixel in the second field being deinterlaced;
      computing a local standard deviation from the local means video component value;
      comparing the local standard deviation with a selected multiple of the global standard deviation; and
      in response to said step of comparing, carrying forward the video component value generated as part of a previous scan of the second field for the pixel being deinterlaced when the local standard deviation is less than the selected multiple of the global standard deviation and setting the video component value for the pixel being deinterlaced to the computed local mean video component value when the local standard deviation exceeds the selected multiple of the global standard deviation; and
   displaying the deinterlaced images using the digital signals video component values selected during said step of deinterlacing.

2. The method of claim 1 wherein said step of computing a global mean video component value comprises the step of computing a global mean video component value from the video component values generated for previous scans of both the first and second fields.

3. The method of claim 1 wherein the at least one video component characterizing each pixel represents the intensity level of each pixel.

4. The method of claim 1 wherein the at least one video component characterizing each pixel represents a color component of each pixel.

5. The method of claim 1 wherein said step of computing a global mean video component value comprises the substeps of:
   taking a running sum of the digital video component values generated for a previous scan of at least one of the first and second fields; and
   dividing the running sum of the video component values generated for the previous scan by the number of pixels in the previous scan.

6. The method of claim 1 wherein said step of computing a global mean video component value comprises the substeps of:
   generating a histogram including a bin representing each one of the possible digital video component values characterizing a given pixel;
   for each bin in the histogram, multiplying the video component value represented by the bin by the number of pixels in the bin;
   summing the products of the number of pixels in a bin and the video component value represented by the bin for all bins in the histogram; and
   dividing the sum of the products of the number of pixels in each bin and the video component value represented by the bin by the total number of pixels from the previous scan.

7. The method of claim 1 wherein said step of computing a global standard deviation comprises the steps of:
   computing the absolute difference between the global mean and the video component value generated for each pixel in a previous scan of at least one of the first and second fields;
   computing the sum of the absolute differences between the global mean and the video component values for all pixels from the previous scan; and
   dividing the sum of the absolute differences between the global mean and the video component values for all the pixels in the previous scan by the number of pixels in the previous scan.

8. The method of claim 1 wherein said step of computing a global standard deviation comprises the step of:
   generating a histogram having a bin for each possible video component value for a given pixel;
   for each bin in the histogram, computing the absolute difference between the video component value represented by the bin and the global mean;
   for each bin, computing the product of the absolute difference between the video component value represented by the bin and the global mean and the number of pixels in the bin;
   computing the sum of the products of the absolute difference between the computed component value represented by the bin and the global mean and the number of pixels in each bin for all bins in the histogram; and
   dividing the sum by the total number of pixels in the previous scan of at least one of the first and second fields.

9. The method of claim 1 wherein said step of computing a local mean video component value comprises the substeps of:
   taking a running sum of the digital video component values generated for a plurality of pixels being updated as part of the current scan of the first field and neighboring a pixel in the second field being deinterlaced; and dividing the running sum by the number of pixels comprising the plurality of pixels being updated as part of the current scan of the first field and neighboring the pixel in the second field being deinterlaced.

10. The method of claim 1 wherein said step of computing a local mean comprises the substeps of:

generating a histogram including a bin representing each one of the possible digital video component values characterizing a given pixel;

for each bin in the histogram, multiplying the video component value represented by the bin by the number of pixels, from a plurality of pixels being updated as part of the current scan of the first field and neighboring a pixel in the second field being deinterlaced, in the bin;

summing the product of the number of pixels in each bin and the video component value represented by the bin for all bins in the histogram; and dividing the sum of the product of the number of pixels in each bin and the video component value represented by the bin by the number of pixels comprising the plurality of pixels being updated as part of the current scan of the first field and neighboring the pixel in the second field being deinterlaced.

11. The method of claim 1 wherein said step of computing a local standard deviation comprises the substeps of:

computing the absolute difference between the local mean and the video component value generated for each pixel of a plurality of pixels being updated as part of the current scan of the first field and neighboring a pixel in the second field being deinterlaced;

computing the sum of the absolute differences between the local mean and the video component values computed for the plurality of pixels being updated as part of the current scan of the first field and neighboring a pixel in the second field being deinterlaced; and dividing the sum of the absolute differences between the number of pixels comprising the plurality of pixels being updated as part of the current scan of the first field and neighboring a pixel in the second field being deinterlaced.

12. The method of claim 1 wherein said step of computing a local standard deviation comprises the substeps of:

generating a histogram having a bin representing each possible video component value for a given pixel;

for each bin in the histogram, computing the absolute difference between the video component value represented by the bin and the local mean;

for each bin, computing the product of the absolute difference between the video component value represented by the bin and the local mean and the number of pixels, plurality of pixels being updated as part of the current scan of the first field and neighboring a pixel in the second field being deinterlaced in the bin;

computing the sum of the products of the absolute difference between the component value represented by the bin and the global mean and the number of pixels in each bin for all bins in the histogram; and dividing the sum by the total number of pixels comprising the plurality of pixels being updated as part of the current scan of the first field and neighboring a pixel in the second field being deinterlaced.

13. A method of filtering video images in a video display system comprising the steps of:

generating video component level signals for pixels of images to be displayed as first and second fields of interlaced rows updated on alternate scans, the component level signals quantified by video component values represented as digital signals;

detecting and replacing corrupted pixels in the first and second fields to produce filtered images using the video component values as represented by the digital signals, said step of detecting and replacing comprising the steps of:

computing a global mean video component value from the video component values generated for a previous scan of at least one of the first and second fields;

computing a global standard deviation from the global mean;

computing a local mean video component value from the video component values generated for the plurality of pixels being updated as part of the current scan of the first field and neighboring a pixel in the first field being tested for corruption;

computing the deviation from the local mean value of the video component value generated to update the pixel being tested as part of the current scan of the first field;

characterizing the video component level of the pixel being tested as quantified the video component value generated to update the pixel being tested as part of the current scan of the first field if the deviation from the local mean is less than a selected multiple of the global standard deviation;

comparing the deviation from the local mean of the video component value of the pixel being tested with a pre-selected threshold value if the deviation from the local mean value exceeds the selected multiple of the global standard deviation;

quantifying the video component level of the pixel being tested in accordance with the video component value generated to update the pixel being tested as part of the current scan of the first field if the deviation from the local mean is less than the threshold value; and replacing the video component value generated to updated the pixel being tested as part of the current scan of the first field with a new video component value if the deviation from the local mean is greater than the threshold value; and displaying the filtered images using the digital signals video component values selected during said step of detecting and replacing.

14. The method of claim 13 wherein the new video component value is the local mean video component value.

15. The method of claim 13 wherein the new video component value is the median local video component value calculated for the plurality of pixels being updated as part of the current scan of the first field and neighboring the pixel in the first field being tested.

16. The method of claim 13 wherein said step of computing a global mean video component value comprises the step of computing a global mean video component value in accordance with the formula:

$$Mg = \frac{\sum_{j=0}^{m-1} P_j}{m}$$

where:
$P_j$ is the value for the video component being processed as characterizing a pixel j from the previous field or fields;
m is the total number of pixels from the previous field or fields used to calculate the global mean; and
$M_g$ is the global mean value.

17. The method of claim 13 wherein said step of computing a global mean video component value comprises the step of computing a global mean video component value in accordance with the equation:

$$Mg = \frac{\sum_{i=0}^{n-1} P_i \times hist(i)}{m}$$

where:
$P_i$ is the video component value represented by bin i;
hist(i) is the number of pixels in bin i;
n is the total number of bins (i.e. 256 in the case of component valves represented by 8 bits); and
m is the total number of pixels used to calculate the global mean as taken from the previous field or fields; and
$M_g$ is the global mean.

18. The method of claim 13 wherein said step of computing a global standard deviation comprises the step of computing a global standard deviation in accordance with the equation:

$$\sigma_g = \frac{\sum_{j=0}^{m-1} |M_g - P_j|}{m}$$

where:
$P_j$ is the value for the video component being processed as characterizing a pixel j from the previous field or fields;
m is the total number of pixels from the previous field or fields used to calculate the global mean;
$M_g$ is the global mean value; and
$\sigma_g$ is the global standard deviation.

19. The method of claim 13 wherein said step of computing a global standard deviation comprises the step of computing a global standard deviation in accordance with the formula:

$$\sigma_g = \frac{\sum_{i=0}^{n-1} |M_g - P_i| \times hist(i)}{m}$$

where:
$P_i$ is the video component value represented by bin i;
hist(i) is the number of pixels in bin i;
n is the total number of bins (i.e. 256 in the case of component valves represented by 8 bits); and
m is the total number of pixels used to calculate the global mean as taken from the previous field or fields;
$M_g$ is the global mean;

$\sigma_g$ is the global standard deviation.

20. The method of claim 13 wherein said step of computing a local mean video component value comprises computing a local mean video component value in accordance with the equation:

$$M_l = \frac{\sum_{k=0}^{l-1} P_k}{l}$$

where:
$P_k$ is the value generated for the current scan for the component being processed as characterizing pixel k from the local neighborhood;
l is the number of pixels in the local neighborhood; and
$M_l$ is the local mean value.

21. The method of claim 13 wherein said step of computing a local mean video component value comprises the step of computing a local mean video component value in accordance with the equation:

$$M_l = \frac{\sum_{q=0}^{r-1} P_q \times hist(q)}{l}$$

where:
$P_q$ is the video component value represented by bin q;
r is the total number of bins;
hist(q) is the total number of pixels from the local neighborhood in bin q;
l is the number of pixels in the local neighborhood; and
$M_l$ is the local mean value.

22. The method of claim 13 wherein said step of computing the deviation from the local mean value of the video component value generated for the pixel being tested comprises the step of computing the deviation from the local mean value in accordance with the equation:

$$\sigma_s = |P_s - M_l|$$

where:
$\sigma_s$ is the deviation from the local mean of pixel s;
$P_2$ is the video component value generated for pixel s in the current scan; and
$M_l$ is the local mean.

23. A video system comprising:
a video display operable to display images as a plurality of pixels each characterized by a video component level;
circuitry for generating said video component levels formatted for the display of images as a plurality of pixels arranged in first and second fields of interlaced rows, updated on alternate scans;
circuitry for quantifying said video component levels by numerical video component values represented by digital signals; and
a processor for deinterlacing said pixels in said first and second fields of interlaced rows, said processor operable to:
compute a global mean video component value from said video component values provided for a previous scan of at least one of the first and second fields;

compute a global standard deviation from said global mean;

compute a local mean video component value from said video component values provided for a current scan of said first field and forming a neighborhood of a said pixel in said second field being deinterlaced;

compute a local standard deviation from said local mean video component value for said pixels in said first field forming said neighborhood of said pixel in said second field being deinterlaced;

compare said local standard deviation with a preselected multiple of said global standard deviation;

carry forward the video component value generated for said pixel being deinterlaced from a previous scan of said second field when said local standard deviation is less than said selected multiple of said global standard deviation and set said video component value for said pixel being deinterlaced to said local mean video component value when said local standard deviation exceeds said selected multiple of said global standard deviation; and generate, for display, the digital signals representing at least one of the carried forward and set video component values for said pixel being deinterlaced.

24. The video system of claim 23 wherein said video component level represents the intensity level of a said pixel in a said image.

25. The video system of claim 23 wherein said video component level represents a color component level of a said pixel in a said image.

26. The video system of claim 23 wherein said processor is operable to compute a global mean video component value from said video component values provided for a previous scan of both said first and second fields.

27. A video system comprising:
a video display operable to display images as a plurality of pixels each characterized by a video component level;

circuitry for generating said video component levels formatted for the display of images as a plurality of pixels arranged in first and second fields of interlaced rows, updated on alternate scans;

circuitry for quantifying said video component levels by numerical video component values represented by digital signals; and a processor for detecting and replacing corrupted pixels in a said image to be displayed, said processor operable to:

compute a global mean video component value from said video component values provided for a previous scan of at least one of said first and second fields;

compute a global standard deviation from said global mean value;

compute a local mean video component value from said video component values provided for a plurality of said pixels being updated as a part of a current scan of said first field and neighboring a said pixel in said first field being tested;

compute the deviation from said local mean value of said video component value generated to update said pixel being tested as part of said current scan of said first field;

compare the deviation from said local mean of said video component value of said pixel being tested with a selected multiple of said global standard deviation;

characterize said video component value of said pixel being tested in accordance with said video component value generated to update said pixel being tested as part of said current scan of said first field if the deviation from said local mean is less than a selected multiple of said global standard deviation;

compare the deviation from said local mean with a pre-selected threshold value if the deviation from said local mean value exceeds said pre-selected multiple of said global standard deviation;

characterize said video component level of said pixel being tested in accordance with said video component value generated to update said pixel being tested as part of said current scan of said first field if the deviation from said local means is less than said threshold value;

replace said video component value generated for said pixel being tested as part of said current scan of said first field with a new video component value if the deviation from said local mean is greater than said threshold value; and generate, for display, the digital signals representing at least one of the video component values generated to update the pixel being tested and replaced video component values generated for the pixel being tested.

28. The video system of claim 27 wherein said new video component value comprises said local mean video component value.

29. The video system of claim 27 wherein said new video component value comprises a median video component value computed from said plurality of pixels being updated as part of said current scan of said first field and neighboring said pixel being tested.

30. A method for displaying images in a video display system, the method comprising the steps of:
generating video component level signals for pixels of images to be displayed as first and second fields of interlaced rows updated on alternate scans, the component level signals quantified by video component values represented as digital signals;

deinterlacing the pixels in the first and second fields to produce pixels for deinterlaced images using the video component values as represented by the digital signals, said step of deinterlacing comprising the steps of:

computing global statistics characterizing the video component values generated for a previous scan of at least one of the first and second fields;

computing local statistics characterizing the video component values generated for the plurality of pixels being updated as part of the current scan of the first field and defining a neighborhood of a pixel in the second field being deinterlaced;

comparing the computed local statistics with the computed global statistics; and in response to said step of comparing, carrying forward the video component value generated as part of a previous scan of the second field for the pixel being deinterlaced when the video component values for the neighborhood as characterized by the local statistics do not differ from the video component values for the previous scan as characterized by the global statistics by a preselected amount and setting the video component value to a new value based on the local statistics when the video component values for the neighborhood as characterized by the local statistics differ from the video component values for the previous scan as characterized by the global statistics by the preselected amount; and displaying the deinterlaced images using the video component values selected during said step of deinterlacing.

31. The method of claim 30 wherein said step of computing global statistics comprises the substeps of:

computing a global mean video component value from the video component values generated for a previous scan of at least one of the first and second fields; and computing a global standard deviation from the global mean.

32. The method of claim 31 wherein said step of computing local statistics comprises the steps of:

computing a local mean video component value from the video component values generated for a plurality of pixels being updated as part of the current scan of the first field and defining a neighborhood of a pixel in the second field being deinterlaced; and computing a local standard deviation from the local mean video component value.

33. The method of claim 32 wherein said step of comparing comprises the step of comparing the local standard deviation with a selected multiple of the global standard deviation and wherein in response to said step of comparing, carrying forward the video component value generated as part of a previous scan of the second field for the pixel being deinterlaced when the local standard deviation is less than the selected multiple of the global standard deviation and setting the video component value for the pixel being deinterlaced to the computed local mean video component value when the local standard deviation exceeds the selected multiple of the global standard deviation.

34. A method of filtering video images in a video display system comprising the steps of:

generating video component level signals for pixels of images to be displayed as first and second fields of interlaced rows updated on alternate scans, the component level signals quantified by video component values represented as digital signals;

detecting and replacing corrupted pixels in the first and second fields to produce filtered images using the video component values as represented by the digital signals, said step of detecting and replacing comprising the steps of:

computing global statistics characterizing the video component values generated for a previous scan of at least one of the first and second fields;

computing local statistics from the video component values generated for a local plurality of pixels being updated as part of the current scan of the first field, the local statistics characterizing any difference between the video component value generated to update a pixel being tested and the video component values generated to update the local plurality of pixels;

comparing the computed global statistics with the computed local statistics, and in response:

quantifying the video component level of the pixel being tested in accordance with the video component value generated to update the pixel being tested as part of the current scan when the comparison indicates that any difference characterized by the local statistics does not vary from the values characterized by the global statistics by a preselected amount;

replacing the video component value generated to update the pixel being tested as part of the current scan of the first field with a new video component value when the comparison indicates that any difference characterized by the local statistics varies from the values characterized by the global statistics by a preselected amount; and displaying the filtered images using the digital signals video component values selected during said step of detecting and replacing.

35. The method of claim 34 wherein said step of computing global statistics comprises the substeps of:

computing a global mean video component value from the video component values generated for a previous scan of at least one of the first and second fields; and computing a global standard deviation from the global mean.

36. The method of claim 35 wherein said step of computing local statistics comprises the substeps of:

computing a local mean video component value from the video component values generated for a plurality of pixels being updated as part of the current scan of the first field and defining a neighborhood of a pixel in the first field being deinterlaced; and computing the deviation from the local mean value of the video component value generated to update the pixel being tested as part of the current scan of the first field.

37. The method of claim 36 and further comprising the steps of:

comparing the deviation from the local mean of the video component value of the pixel being tested with a pre-selected threshold value if the deviation from the local mean value exceeds the selected multiple of the global standard deviation;

quantifying the video component level of the pixel being tested in accordance with the video component value generated to update the pixel being tested as part of the current scan of the first field if the deviation from the local mean is less than the threshold value.

* * * * *